(12) United States Patent
Witmer

(10) Patent No.: US 8,949,021 B2
(45) Date of Patent: Feb. 3, 2015

(54) PROBE DATA PROCESSING

(75) Inventor: James Alan Witmer, Lebanon, NH (US)

(73) Assignee: TomTom North America, Inc., Lebanon, NH (US)

( * ) Notice: Subject to any disclaimer, the term of this patent is extended or adjusted under 35 U.S.C. 154(b) by 93 days.

(21) Appl. No.: 13/640,113

(22) PCT Filed: Apr. 8, 2011

(86) PCT No.: PCT/US2011/031653
§ 371 (c)(1),
(2), (4) Date: Oct. 9, 2012

(87) PCT Pub. No.: WO2011/127332
PCT Pub. Date: Oct. 13, 2011

(65) Prior Publication Data
US 2013/0030690 A1    Jan. 31, 2013

Related U.S. Application Data

(60) Provisional application No. 61/342,068, filed on Apr. 9, 2010.

(51) Int. Cl.
*G01C 21/30*    (2006.01)
*G01C 21/32*    (2006.01)
(Continued)

(52) U.S. Cl.
CPC ............... *G01C 21/32* (2013.01); *G01C 21/30* (2013.01); *G06F 17/30241* (2013.01); *G09B 29/106* (2013.01)
USPC ........... 701/409; 701/430; 701/445; 701/446; 701/448; 701/532

(58) Field of Classification Search
CPC ............ G06K 9/00791; G06K 9/6255; G06K 9/00818; G06K 9/00885; G06K 9/40; G01C 21/3676; G01C 21/26; G01C 1/3679; G01C 21/32; G01C 21/34; G06F 17/30864; G06F 17/3087; G06F 17/10; G06F 17/16; G06F 3/048; G08G 1/096811; G08G 1/096838; G08G 1/01; G08G 1/167; G08G 1/127
USPC ......... 382/209, 284, 173, 113, 159, 174, 181, 382/190, 195, 199, 293; 701/409, 533, 431, 701/426, 410, 425, 438, 532; 340/466, 936, 340/990, 995.19
See application file for complete search history.

(56) References Cited

U.S. PATENT DOCUMENTS 5,848,374 A * 12/1998 Wakabayashi et al. ....... 701/455
5,948,042 A *  9/1999 Heimann et al. .............. 701/409
(Continued)

FOREIGN PATENT DOCUMENTS

EP         0166547 A2    1/1986
WO      2010084139 A1    7/2010
WO    WO 2011023247 A1 * 3/2011

OTHER PUBLICATIONS

International Search Report issued Aug. 2, 2011 for International Application No. PCT/US2011/031653.
(Continued)

*Primary Examiner* — Calvin Cheung
*Assistant Examiner* — Luis A Martinez Borrero

(57) ABSTRACT

A method of processing probe trace data to determine a measure of correlation of a probe trace with other probe traces comprises obtaining a map that associates a parameter space with a plurality of pixels, wherein at least one correlation value is assigned to each of the plurality of pixels, and determining a correlation score for a probe trace by mapping the probe trace to at least one pixel of the map and determining the correlation score for the probe trace from at least one correlation value of the at least one pixel to which the probe trace is mapped.

14 Claims, 4 Drawing Sheets

(51) Int. Cl.
*G06F 17/30* (2006.01)
*G09B 29/10* (2006.01)

(56) References Cited

U.S. PATENT DOCUMENTS

| | | | | |
|---|---|---|---|---|
| 6,640,187 | B1* | 10/2003 | Chenault et al. | 701/409 |
| 8,295,547 | B1* | 10/2012 | Cangiani | 382/103 |
| 8,660,316 | B2* | 2/2014 | Mays et al. | 382/113 |
| 2003/0191583 | A1* | 10/2003 | Uhlmann et al. | 701/208 |
| 2005/0085996 | A1* | 4/2005 | Park et al. | 701/208 |
| 2006/0217879 | A1* | 9/2006 | Ikeuchi et al. | 701/208 |
| 2009/0140887 | A1* | 6/2009 | Breed et al. | 340/990 |
| 2011/0216935 | A1* | 9/2011 | Mays et al. | 382/100 |
| 2011/0238291 | A1* | 9/2011 | Bach | 701/201 |
| 2011/0243455 | A1* | 10/2011 | Miyajima | 382/201 |
| 2011/0243457 | A1* | 10/2011 | Miyajima | 382/209 |
| 2011/0276592 | A1* | 11/2011 | Gautama et al. | 707/769 |
| 2012/0197839 | A1* | 8/2012 | Vervaet et al. | 707/609 |
| 2012/0209518 | A1* | 8/2012 | Nowak et al. | 701/445 |
| 2012/0259547 | A1* | 10/2012 | Morlock et al. | 701/533 |
| 2012/0277985 | A1* | 11/2012 | Witmer | 701/119 |
| 2012/0277993 | A1* | 11/2012 | Mund | 701/450 |

OTHER PUBLICATIONS

Stefan Schroedl et al: "Mining GPS Traces for Map Refinement", Data Mining and Knowledge Discovery, Kluwer Academic Publishers, BO, vol. 9. No. 1. Jul. 1, 2004. pp. 59-87, XP019277108.

Bruntrup R et al: "Incremental map generation with GPS traces", Intelligent Transportation Systems, 2005. Proceedings. 2005 IEEE Vienna, Austria Sep. 13-16, 2005, Piscataway, NJ, USA,IEEE, Sep. 13, 2005, pp. 413-418, XPO10843059.

* cited by examiner

PROBE DATA PROCESSING

CROSS-REFERENCES TO RELATED APPLICATIONS

This application is the National Stage of International Application No. PCT/US2011/031653, filed Apr. 8, 2011 and designating the United States. The application claims the benefit of U.S. Provisional Application No. 61/342,068 filed Apr. 9, 2010. The entire contents of both these applications are incorporated herein by reference.

FIELD

The present invention relates to the processing of probe data, for example probe data obtained from navigation devices such as GPS-enabled navigation devices.

BACKGROUND

Portable computing devices, for example Portable Navigation Devices (PNDs) that include GPS (Global Positioning System) signal reception and processing functionality are well known and are widely employed as in-car or other vehicle navigation systems.

The utility of such PNDs is manifested primarily in their ability to determine a route between a first location (usually a start or current location) and a second location (usually a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

The PND determines the route based upon stored geographical data, usually in the form of a digital map. The stored geographical data can include data concerning a wide variety of features, for example the position and characteristics of roads or other thoroughfares, the position and characteristics of points of interest, and the position and characteristics of geographical features, for example rivers, coastlines, or mountains.

The accuracy of the stored geographical data can vary, and the location and characteristics of features can change over time.

In operation, most PNDs periodically log their own position as a function of time, for example every five seconds. PNDs can also log other, associated, data such as speed or direction of travel as a function of time. In some cases, the PNDs also log user input data, for example relating to the position or other properties of a point of interest. The data logged by PNDs or other portable computing devices, can be referred to as probe data. Data from a single device, either a single point or a series of points obtained over time, can be referred to as a probe trace. It is known to obtain probe data from a large number of PNDs or other portable computing devices, and to process the probe data in order to verify or supplement existing geographical data, for example existing digital maps. In a simple example, if many probe traces are obtained from positions parallel to a segment of road stored in a digital map, and no or few probe traces are obtained from the stored segment of road, then it may be concluded that the position of the segment of road stored in the digital map is incorrect and should be modified.

However, the reliability of any particular set of probe data can be difficult to determine. Usually, in the case of uncoordinated events such as probe trace position capture or for reported information such as point of interest (POI) data, the accuracy and veracity of an event is highly correlated to the number of similar events recorded by independent sources. In most such cases, additional information such as direction of travel, type or name of POI, type of request, must also be considered. That is, it may be desired to know that a large number of probe traces agreed on both relative position and relative direction. Similarly it may be desired to know that POI requests came in for the same type of establishment, or were named similarly, or were uniformly "add" requests, as opposed to "delete" requests.

A particularly complex application has been in building information from uncoordinated probe traces. The trace data is relatively noisy and unreliable—some traces can diverge from their true positions by hundreds of meters without indicating a problem. Even when the error is smaller, say tens of meters, a trace may match incorrectly to a nearby road segment that is parallel to its actual location. It may be desirable to recognize such traces, and either avoid or correct them for use in determining road position, average height, speed, or other attributes at a location. Conversely, it may be desirable to build high trust for trace paths that are well corroborated by population averages—these trace paths indicate equipment that is in good repair, functioning at optimal fidelity. The value of any probe-derived data can be significantly improved by selectively weighting and using the best trace sources.

It is known to perform probe trace correlation using spatial clustering techniques. Many means of mathematical clustering are available. According to the prior art, all probe trace points can be connected by straight or curved lines, and those lines placed into a geographic index, and that index reorganized into spatial clusters. These clusters can be analyzed to determine proximity and corroboration.

The clusters are used to select portions of raw probe data that are of relevance to a particular location or feature (for example a particular segment of road) and the selected probe data is then processed to obtain further information concerning the feature or to verify digital map data concerning the feature.

Clustering by its nature collects and organizes data, and this aspect of the technique can lose or distort important information. For example, a given cluster may be considered to be a selection of trace segments. As the clustering requires a selection, nearby segments that don't meet the clustering criteria are not considered. Alternatively, clusters may be designed to overlap, meaning that one trace segment is in more than one cluster; however, such designs multiply the amount of analysis work and computation that must be done, and do not address the fundamental issue that a cluster does not completely capture the proximity relationships of the data.

Clustering falls prey to a second issue: the cluster itself must be assigned to a location representative of its members. It may be assigned to a single point or a bounding box; but in either case it is a static representation of a group of members, rather than a statistical representation around a locus—thus it suffers spatial inaccuracy.

The issues mentioned in the preceding two paragraphs can be referred to as data generalization, caused by the binary inclusion or exclusion of data from any cluster; and spatial contamination, the influence of disparate paths or errant data that are aggregated together due to spatial coincidence within a cluster's region. These issues can be only partially mitigated by techniques such as creating clusters with more overlapping content, or creating finer clustering grids. Such mitigation techniques tend to produce excessive computational burdens, with little improvement in results.

Clustering techniques can be used for trace capture points themselves (that is, without connecting them with lines or curves). Such a technique tends to fall even further from the ideal, failing to recognize common travel in sparse situations in which the points themselves are far apart, even though the traveled paths have commonality.

Known techniques for dealing with POI updates also present difficulties. Updates are usually resolved manually—by human review of each request, or using rudimentary clustering techniques to identify hot spots—again presenting issues stemming from data generalization and spatial contamination.

SUMMARY

In an independent aspect of the invention there is provided a method of processing probe trace data to determine a measure of correlation of a probe trace with other probe traces, the method comprises obtaining a map that associates a parameter space to a plurality of pixels, wherein at least one correlation value is assigned to each of the plurality of pixels; and determining a correlation score for a probe trace by mapping the probe trace to at least one pixel of the map and determining the correlation score for the probe trace from at least one correlation value of the at least one pixel to which the probe trace is mapped.

By determining a correlation score for a probe trace by mapping the probe trace to a pixel map, an efficient and accurate method for determining the correlation of a probe trace with other probe traces can be obtained.

The correlation score determined for a probe trace may be representative of the similarity of the probe trace to other probe traces. The at least one correlation value assigned to a pixel may be representative of the number of other probe traces that map to the pixel.

Each pixel may represent a range of values in the parameter space. Each pixel may comprise a data element for storing the at least one correlation value. Although the data represented by pixels may be plotted or displayed if so desired, in accordance with known data processing and display techniques, the pixels may be data storage elements rather than dedicated display or display data elements.

The parameter space may represent probe position. Whilst representing probe position using the pixel map can be particularly useful, the parameter space represented by the pixel map may represent any other suitable parameter, for example, direction, speed, height, vehicle type, or property of a point of interest.

The probe trace may comprise a plurality of probe points, and the determining of the correlation score may comprise mapping each probe point to a respective pixel, and determining a score for each probe point.

The probe trace may comprise a plurality of probe trace segments, and the method may comprise mapping each probe trace segment to a respective at least one pixel, and determining a score for each probe trace segment. The score for a probe trace segment obtained from the at least one pixel may be weighted by the length of the portion of the probe trace segment that traverses the pixel.

The method may comprise determining the score for a probe trace by summing the scores obtained for each point or segment of the probe trace. The summing may comprise a weighted summing.

The pixel map may further comprise, for each pixel, an array of data elements representing a further parameter space.

The further parameter space may represent any suitable parameter, for example, position, direction, speed, height, vehicle type, or property of a point of interest.

For each pixel, a correlation value may be assigned to each data element of the array of data elements.

The determining of the correlation score for the probe trace may comprise mapping the probe trace to at least one data element of at least one pixel of the map and determining the correlation score for the probe trace from the at least one correlation value of the at least one data element to which the probe trace is mapped.

The method may further comprise determining the correlation value to be assigned to each pixel, wherein determining the correlation values comprises mapping a plurality of probe traces to the pixels, and determining, for each pixel, the at least one correlation value for the pixel from the traces mapped to the pixel.

The method may further comprise determining the correlation value to be assigned to each data element of each pixel, wherein determining the correlation values comprises mapping a plurality of probe traces to the data elements, and determining, for each data element, the correlation value for the data element from the probe traces mapped to the data element.

The correlation value for each pixel or data element may be representative of the number of probe traces assigned to that pixel or data element.

At least one weighting may be assigned to each probe trace, and the correlation value for each pixel or data element may be representative of the number of pieces of probe data assigned to that pixel or data element, weighted by the at least one of the weightings assigned to the probe trace.

The weighting applied to a probe trace may be representative of the expected reliability of the probe trace. For example, the weighting of a probe trace may be determined from the probe type or other property, or from a recorded operating parameter for the probe. The weighting of a probe trace may be determined from a horizontal dilution of precision (HDOP) value which is usually recorded for each stored location for the probe trace.

The method may further comprise applying at least one of a scaling, smoothing or normalisation process, for example a Gaussian smoothing process, to the correlation values assigned to the plurality of pixels and/or to the correlation values assigned to the plurality of data elements.

The method may further comprise comparing the score determined for the probe trace to a threshold, and selecting or discarding the probe trace in dependence on the comparison.

The probe trace may comprise a plurality of points or segments, and the method may comprise determining a score for each point or segment of the probe trace, comparing the score determined for each point or segment of the probe trace to a threshold, and selecting or discarding each point or segment in dependence on the comparison.

The method may further comprise selecting or discarding further points or segments based on their proximity to a discarded point or segment and/or based on comparison to a further threshold.

The method may comprise determining a score for a plurality of probe traces, determining a ranking of scores assigned to the plurality of probe traces and selecting or discarding probe traces based upon the ranking.

The method may comprise performing a further process using the selected probe trace, probe traces, points or segments.

The further process may comprise generating or amending a digital map using the selected probe traces or probe traces, or points or lines of the probe trace or probe traces.

In a further independent aspect of the invention there is provided a system for processing probe trace data to determine a measure of correlation of a probe trace with other probe traces, the system comprising a processing resource configured to:—obtain a map that maps a parameter space to a plurality of pixels, wherein at least one correlation value is assigned to each of the plurality of pixels; and determine a correlation score for a probe trace by mapping the probe trace to at least one pixel of the map and determining the correlation score for the probe trace from at least one correlation value of the at least one pixel to which the probe trace is mapped.

In another independent aspect of the invention there is provided a computer program product comprising computer-readable instructions that are executable to perform a method as claimed or described herein.

Features in one aspect may be applied to another aspect in any suitable combination. For example, method features may be applied as apparatus features and vice versa.

BRIEF DESCRIPTION OF THE DRAWINGS

At least one embodiment of the invention will now be described, by way of example only, with reference to the accompanying drawings, in which.

DETAILED DESCRIPTION OF EMBODIMENTS

Figure 1:
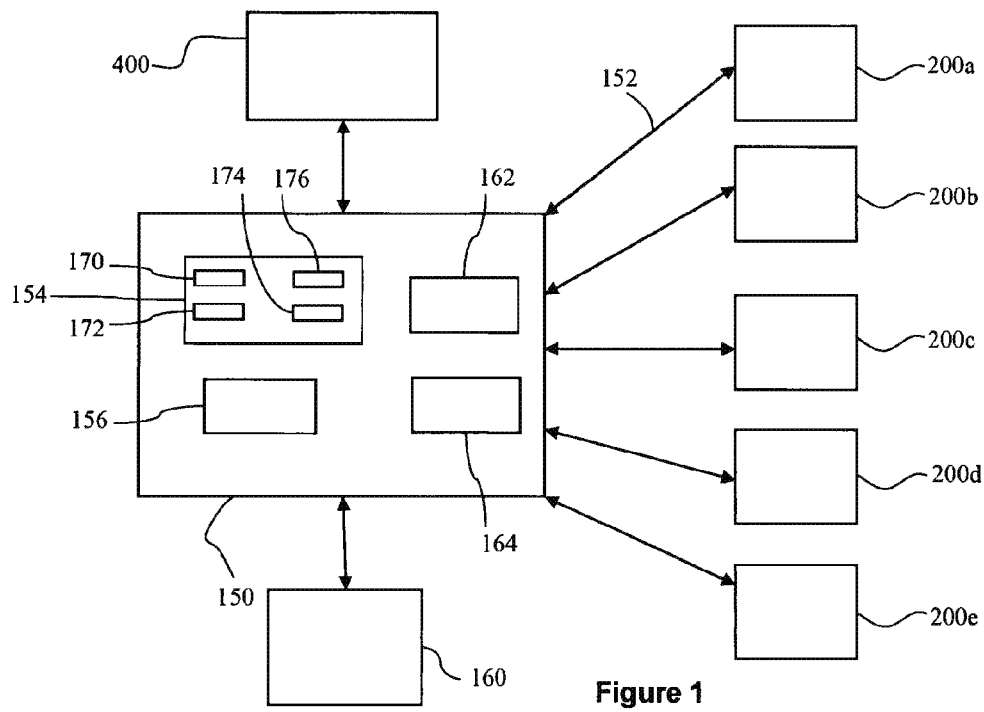
FIG. 1 is a schematic diagram of a system for processing probe data according to an embodiment.

A system for processing probe data from PNDs or other portable computing devices according to an embodiment is illustrated schematically in FIG. 1.

The system comprises a server 150 that is operable to communicate with a plurality of portable devices, for example PNDs 200a to 200e. Only five navigation devices 200a to 200e are shown for clarity, but it will be understood that in practice many thousands, or more, devices may be in communication with the server 150.

In the embodiment of FIG. 1 the devices 200a to 200e are vehicle-mounted PNDs, that use Global Positioning System (GPS) technology to determine their positions, and that are able to perform navigation or mapping operations. Examples of such devices include, but are not limited to the 920T model manufactured and supplied by TomTom International B.V.

The server 150 includes a processor 154 operatively connected to a memory 156. In operation, software stored in server memory 156 is read by the processor 154 to load software modules or other software components that enable the processor 154, to perform various processing or communication functions. In the embodiment of FIG. 1, the software modules comprise a probe data analysis module 170 for processing probe data received from the devices 200a to 200e, a pixel map module 172 for generating pixel map structures for use in the processing of the probe data, a probe data selection module 174 for selecting probe data based on the processing of the probe data, and a digital mapping module 176 for verifying or updating digital map data using the selected probe data. The operation of the various modules will be described in more detail below.

The server 150 is further operatively connected to a mass data storage device 160. The mass storage device 160 contains a store of navigation data, and can again be a separate device from the server 150 or can be incorporated into the server 150. The mass data storage device 160 can be used to store probe data from the devices 200a to 200e.

The server 150 is also in operative communication with map data store 400, which stores digital map data or other geographical data. In alternative embodiments, the map data store forms part of the mass data storage 160, although in FIG. 1 it is shown as being a separate component. The map data stored in the data store 400 includes a digital graph of a road network describing the topology of the road network as a mathematical graph using nodes and connection structures (road segments).

The processor 154 is operable to transmit and receive information to and from devices 200a to 200e via communications channel 152, for example via transmitter 162 and receiver 164. The signals sent and received may include data and/or other propagated signals. The transmitter 162 and receiver 164 may be selected or designed according to the communications requirement and communication technology used in the communication design for the navigation system 200. Further, it should be noted that the functions of the transmitter 162 and receiver 164 may be combined into a single transceiver.

In the normal course of operation of the navigation devices 200a to 200e, GPS data from the devices are regularly recorded (for example, each 5 seconds for some systems) as probe data on a logging device, usually in the form of a data logger module included on the portable navigation devices themselves.

The probe data for each navigation device is transmitted to the server 150 via communications channel 152. In the embodiment of FIG. 1, the channel 152 may comprise an internet connection established when the navigation device is docked by the user in a docking station for charging or updating. The user is usually asked for his or her permission to transmit the probe data to the server, and it has been found that most users permit such transmission of the probe data. In a variant of the described embodiment, the data is transmitted directly from the navigation devices 200a to 200e using a wireless connection. In each case, the probe data is treated anonymously and cannot be tracked back to a particular user.

As well as receiving and processing probe data received from the devices 200a to 200e, the server 150 can also provide data to the devices 200a to 200e, for example in the form of digital map data (for example, digital map data updated in view of received probe data), software upgrades, or traffic updates.

Although the communication channel 152 of the embodiment of FIG. 1 may comprise an internet connection, any suitable form of data channel can be used. The communication channel 152 is not limited to a particular communication technology. Additionally, the communication channel 152 is not limited to a single communication technology; that is, the channel 152 may include several communication links that use a variety of technology. For example, the communication channel 152 can be adapted to provide a path for electrical, optical, and/or electromagnetic communications. As such, the communication channel 152 includes, but is not limited to, one or a combination of the following: electric circuits, electrical conductors such as wires and coaxial cables, fibre optic cables, converters, radio-frequency (RF) waves, the atmosphere, or free space. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications, etc. Additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 152. These signals may be modulated, encrypted and/or compressed.

The server 150 stores all of the probe data collected over time in the mass data storage 160. It will be understood that a huge quantity of probe data from many users is built up, and over time probe data representative of travel over every possible road in a region or network is obtained. As well as providing location information, the probe data can be analysed to provide speed or other trajectory data or operational data for each navigation device if required.

It is a feature of the embodiment of FIG. 1 that the stored probe data is processed by the server 150 using pixel map techniques to determine a score for each set of probe data, or for each part of each set of probe data. The score can be used subsequently to determine those sets of probe data that are correlated well with each other and, for example, to discard sets of probe data or parts of sets of probe data, that do not correlate well. The selected probe data can then be used to accurately generate, check or augment digital map data. By using pixel map techniques a score can be assigned based on previous statistical analysis of probe data without requiring the subsequent analysis of many sets of raw probe data to assign a score to each individual set of probe data. The use of pixel map techniques advantageously can limit both data generalization and spatial contamination issues, whilst reducing computational work.

Figure 2:
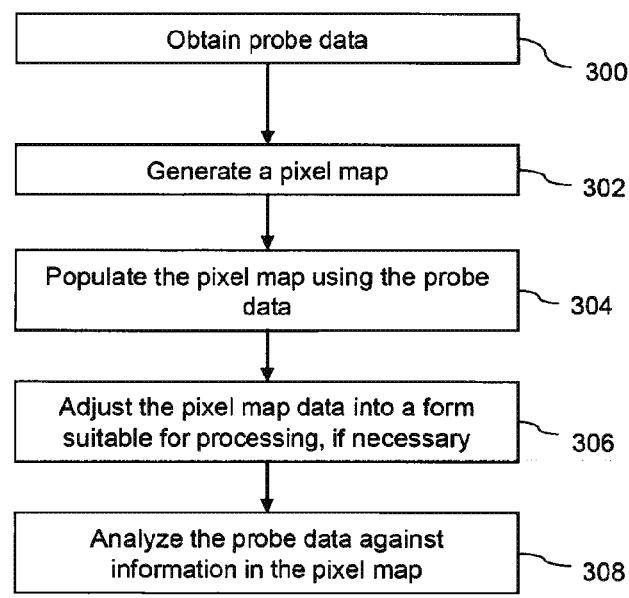
FIG. 2 is a flowchart illustrating in overview a method of processing probe data.

The process performed by the system of FIG. 1 is illustrated in overview in the flowchart of FIG. 2.

At the first stage of the process 300 the probe data for use in generation of the pixel map is obtained by the probe data analysis module 170 at the processor 150, usually by reading the probe data from the mass data store 160. The probe data that is obtained is usually data that is relevant for a particular analysis procedure or application. For example, if the analysis procedure was intended to analyse data relevant to a particular road or road segment, then probe data including position data within a predetermined distance of the particular road or road segment may be obtained.

At the next stage of the process 302, the pixel map module 172 generates a pixel map that is suitable for the subsequent analysis. The pixel map is generated to be such as to represent information from the probe data that is appropriate for the particular analysis or application that is desired.

For example, in one case it may be desired to perform analysis of probe data based upon probe position only. In that case, a pixel map may be generated that maps probe points or probe lines to particular pixels based only on position represented by each probe point or probe line. However, a pixel map can be used to map probe data based on any suitable parameter, and the parameter does not have to be position (or intensity).

Each pixel may also include one or more additional dimensions that are pertinent to the analysis required. These dimensions are often suitably represented as "buckets", an array of values that can be accrued, may be further manipulated into statistical information and may eventually be compared with individual data elements to learn more about the individual data elements.

Each pixel can represent a particular coverage in n-space (an n-dimensional parameter space, where n can be any integer). A pixel's location may be defined to be an orthogonal, isometric n-dimensional region; that is, a region in which all boundaries are perpendicular and with dimensional lengths of equal size (for example, a square or cube). However, that is not essential; the use of a two-dimensional, square pixel described in embodiments below is illustrative only, and any suitable pixel geometry can be used. The n-space dimensions also need not be spatial. One or more dimensions may represent time, signal quality, or any other parameter.

Each pixel itself may hold other dimensional data; thus there is no reason that the pixel cannot itself be composed of data arranged as pixel maps. The choice of which parameters should be mapped to buckets or arrays within a pixel, versus parameters that should be mapped to the pixels, can vary depending on the nature of the probe data and the desired application.

Pixel map representation is particularly suitable when two or more dimensions are related (as the x, y dimensions in a plane) and when the data distribution across those dimensions is interdependent. Pixel map representation is also influenced by the need for and availability of pixel map manipulation and diagnostic code. Thus, in some embodiments pixel maps may be utilized within each pixel for analysis of dimensional data that requires the most intense manipulation or scrutiny.

At the next stage 304 of the process the pixel map is populated by accrual of the probe data into the pixel map. Each data item from the obtained probe data (for example, each probe trace capture point or probe trace segment) is mapped to a pixel or pixels.

Information representing a data item (for example a probe trace capture point or probe trace segment) may be accrued into a single pixel or into a plurality of pixels. For example, in the case of probe trace positions in one embodiment, data may be added to all pixels that best correspond to both the captured probe points and to the hypothetical travel path (a polyline or a computed curve) connecting those points.

One or more correlation values are accrued into each pixel for a given data item (for example for a given probe trace capture point, or probe trace segment). Those values may represent attributes that can be used to distinguish similar versus dissimilar data thus mitigating possible spatial contamination within the pixels. In the case of trace geometry using a common transportation network, attributes such as direction, height, and speed may be useful in distinguishing similar trace paths.

At the end of stage 304, each pixel in the pixel map (and each bucket of each pixel, if present) accrues a value or score based upon the data items mapped to that pixel. In a simple case, the value or score attributed to a particular pixel may be equal to the number of probe trace capture points mapped to that pixel. However, more sophisticated scoring may be used in other embodiments, and weightings may be applied to represent, for example, the expected reliability of each probe point.

Following accrual, there may be an additional stage 306 at which the pixel map data is normalized, rectified, modified or otherwise adjusted for use in later analysis. In one embodiment, for example, the values of the pixel map are subjected to a Gaussian blur process in both spatial (x, y) and other dimensions (direction, speed, height) such that after the Gaussian blur process, the value or score attributed to each pixel represents a relative likelihood that a given parameter value will be found at that location.

The resulting pixel map can be used in a variety of subsequent data analysis procedures. For example at the next stage 308 of the process of FIG. 2, the probe data is analyzed against the pixel map, so as to select particular probe traces or parts of probe traces that correlate well with other probe traces or parts of probe traces. Probe traces, or parts of probe traces, that do not correlate well may be discarded from further analysis.

In some embodiments, the pixel map is used to determine the relative value of each probe trace line. The probe trace line may be a fitted line that joins, or is otherwise fitted to, each successive probe trace capture point obtained from a single probe. For each probe trace line, the likelihood values for its attributes are accrued from the scores or values attributed (from stages 304 and 306) to all pixels that it traverses. The final sum may be an n-dimensional value indicating goodness of multiple attributes, or may be computed into a single value indicating overall goodness. The value can be referred to as the correlation score for the trace.

The correlation score indicates the trace's general conformance with other traces in heavily travelled areas. Although a randomly incorrect trace may occasionally match other traces within a few pixels, over the course of time it will tend to traverse mostly low value pixels, resulting in a low overall correlation score.

The scores determined for each individual trace can subsequently be used to select particular traces for use in further analyses or other processes, for example for use in correcting or verifying digital map data. For instance, in later analyses, the highest scoring traces are used as seed traces for position, speed, and other attribution, and nearby traces will be matched to them in a bundling process. Data analysis programs are given the correlation score for each trace, and can use this score to build weighted averages and in decision making. The lowest scoring traces, particularly those whose correlation score is nearly indistinguishable from random noise, will be given very low weight or may be discarded entirely.

In another embodiment, a correlation score is calculated for each probe trace segment. The correlation score is monitored for successive probe trace segments; whenever the score falls below a low threshold, that segment and any attached segments that have a score below another, slightly higher correlation threshold, are removed from consideration. This embodiment facilitates recognizing when a trace temporarily becomes unreliable despite device information that may fail to indicate that fact: for example when a user exits his vehicle on foot with a live GPS unit, or when the unit's source signal is temporarily disrupted by environmental disturbance.

A more detailed example of operation of the system of FIG. 1 according to one embodiment will now be described with reference to FIGS. 3 to 7, which illustrate the use of the system to identify reliable geometry from uncoordinated probe traces.

Figure 3:
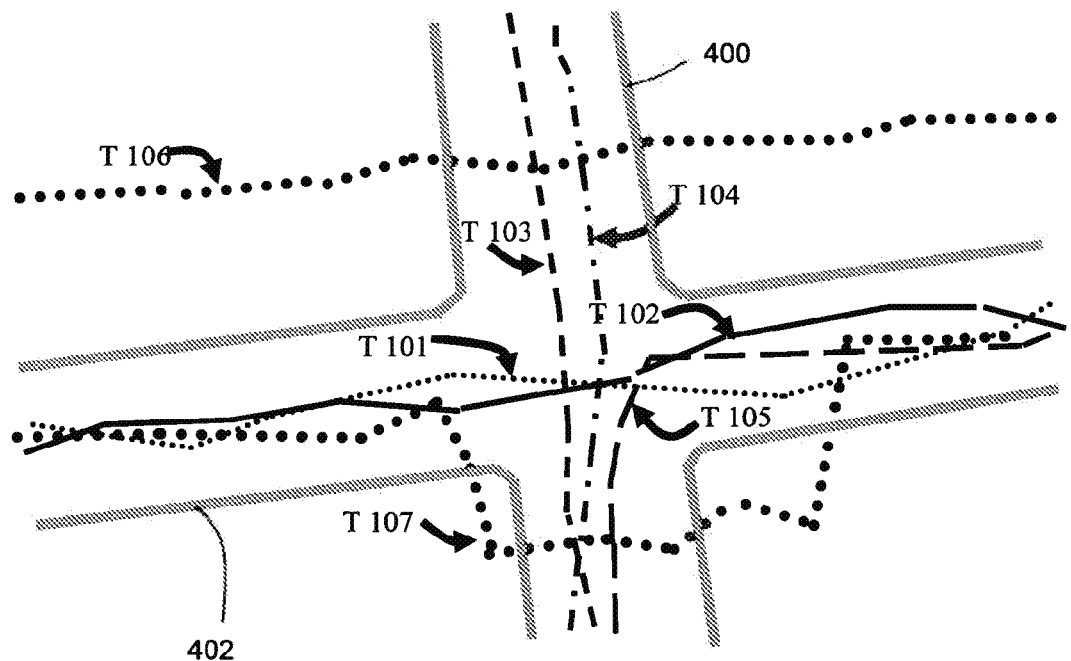
FIG. 3 is a plot of probe data to be processed using the method of FIG. 2 according to an embodiment.

FIG. 3 is a schematic illustration showing a plurality of probe traces T101, T102, T103, T104, T105, T106 and T107 overlaid on the positions of two roadways 400, 402 intersecting at a crossroads. By standard convention the schematic is drawn from an overhead view, with the North direction being upwards. Each probe trace is obtained from a respective, different probe in this case, although it is possible that different probe traces may be obtained from the same probe at different times in other examples. Each probe trace comprises a succession of probe trace segments, each probe trace segment joining successive probe trace capture points obtained from a respective probe. Each probe trace capture point of a probe trace represents the position of the probe determined, for example, by a respective GPS measurement.

The curbs of the roadways 400, 402 are shown for illustration purposes only in FIG. 3. Actual roadway positions need not be known for successful operation of the system. For further simplicity, we arbitrarily limit travel in this example to vehicles traveling either eastbound or northbound; we may assume, for descriptive purposes, that the two roadways 400, 402 are one-way. It will be understood by one of ordinary skill in the art that the system works equally well with no restrictions in travel direction in the actual street network.

Traces T101 and T102 are traveling eastbound (left to right in the illustration) on roadway 402, T103 and T104 are traveling northbound (bottom to top in the illustration) on roadway 400. T105 represents a trace of a vehicle that has been traveling northerly on roadway 400, and makes a right-hand turn onto the eastbound roadway 402. T106 is an invalid trace from a malfunctioning or poorly adjusted unit installed in an eastbound vehicle, that is not recording accurate locations. T107 is also an eastbound vehicle, on roadway 402, with sensors operating well about the first half of its path; the sensors report a few erroneous readings for a portion of the trip, then correct, yielding a path that follows population norms only during part of its trip.

In the processing of the probe data illustrated in FIG. 3, the pixel map module 172, generates a pixel map based on orthogonal, isometric pixel coverage squares over the analysis region. In this case, each pixel represents a different range of values of probe position.

The squares are given a size that is small enough to distinguish at minimum one expected standard deviation of trace error. An exact relationship to standard deviation is not required; rather, the choice of pixel size is chosen so that the pixels are fine enough to detect outlier data, yet as large as possible within that constraint so that there are as few pixels needed for processing as possible. For instance, suppose the expected standard deviation in probe trace position is 5 meters. In that case, a pixel size of roughly 3.5 meters (5 meters×$\sqrt{2}/2$) by 3.5 meters would be chosen, so that the diagonal across the pixel would be no larger than the 5 meters, the expected standard deviation of the trace position.

Figure 4:
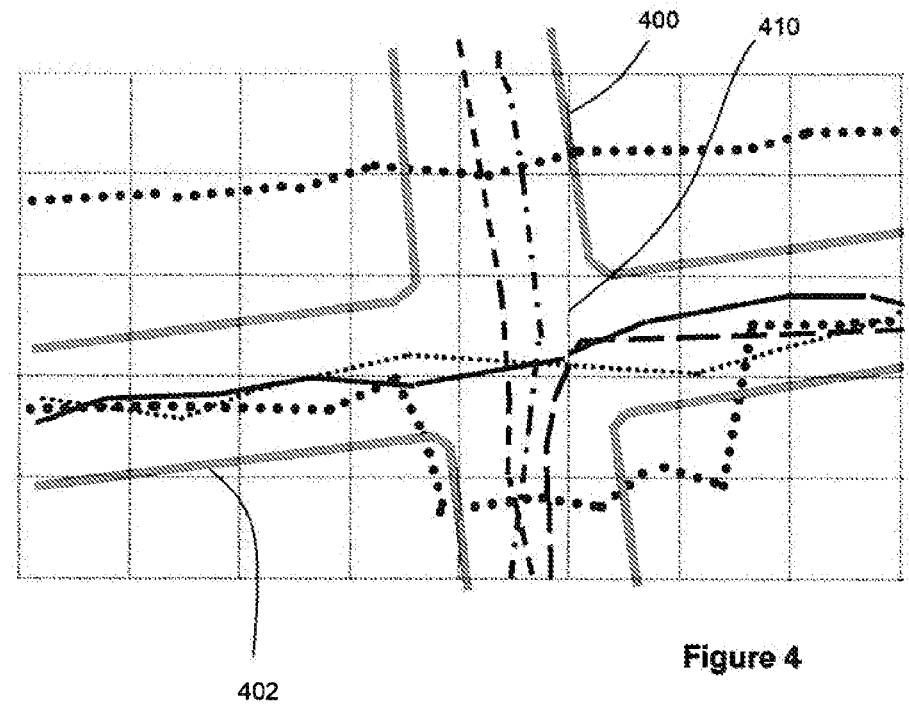
FIG. 4 is a plot of the probe data of FIG. 3 overlaid with the pixel boundaries of a pixel map.

FIG. 4 shows the original trace data and road infrastructure, with overlaid pixel boundaries representing the pixel map generated by the pixel map module 172. The central pixel 410 of the pixel map is labeled by way of example in FIG. 4.

The pixel map module also generates an array, or set of buckets for each pixel. For each pixel, each entry in the array (each bucket) represents a different range of directions of travel. In this case, a set of 36 buckets is assigned to each pixel, with the first bucket being used to represent traces in that pixel having a direction of travel (relative to North) in the range 0-10 degree azimuth, the second bucket being used to represent traces in that pixel having a direction of travel in the range 10-20 degrees, the third bucket being used to represent traces in that pixel having a direction of travel in the range 20-30 degrees, etc.

Figure 5:
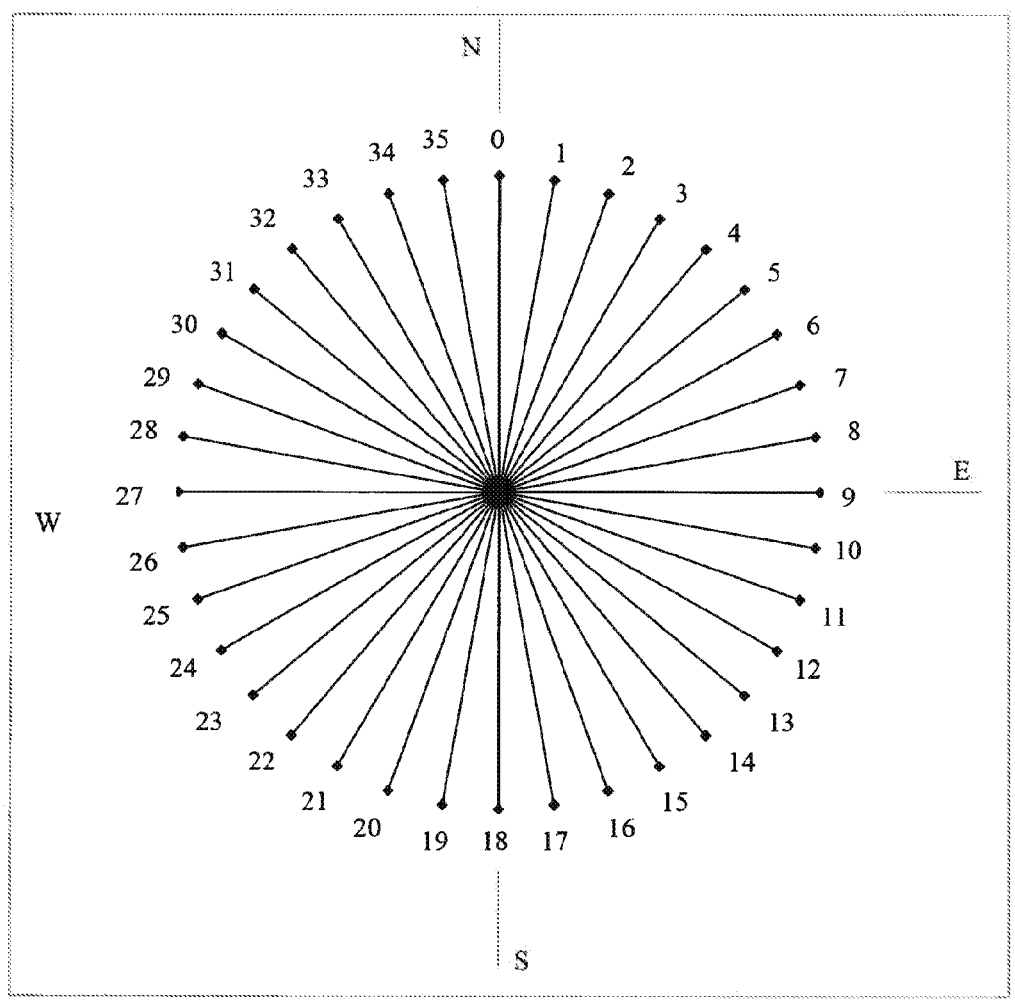
FIG. 5 is a schematic illustration of the division of a direction parameter into data buckets of a pixel.

The ranges of directions of travel represented by buckets 1 to 36 for each pixel are represented graphically in FIG. 5, with each bucket representing a range of angles between two successive ones of the lines labeled 0 to 35.

As with the choice of pixel size, in this case the bucket sizes are chosen to be large enough to be manageable and efficient, yet small enough to at least distinguish one standard deviation in expected travel direction.

At the next stage 304, the pixel map module populates the pixel map with the probe data T101 to T107, and a value is determined for each pixel and each bucket of the pixel.

Data accrual into the buckets may occur in various different ways. In the present case, for each probe trace in a given direction, a value representative of the distance the probe trace traverses in that direction within the pixel is attributed to a particular bucket representative of that direction.

For each trace, the probe data analysis module 170 determines the direction of travel, the distance of travel in that direction, and the probe position, along the length of the trace. The pixel map module 304 then accrues a value to one or more pixels and one or more buckets, based upon the determined distances, positions and directions for that probe trace. The process is performed for each trace T101 to T107.

In the example of FIGS. 3 and 4, the values accrued to buckets from a particular trace are also weighted by a weighting factor representative of the expected accuracy of the probe signal. In this case, the weighting factor is representative of the horizontal dilution of precision (HDOP) value recorded for the probe signal. The HDOP value is usually recorded at the time of measurement of position by the probe, and may be stored as part of the probe data. If an HDOP value is not known for a particular trace then a default weighting factor, for example 1, is used for that trace. In an embodiment pertaining to a convention in which HDOP is related to a device's optimal standard error of position, such that a value of 1 means the optimal standard error applies, 2 means that the standard error likely is doubled, 3 means that the standard error likely is trebled, etc; a weighting factor is assigned to be 1/(HDOP), such that the trace is weighted 1 for HDOP 1, ½ or HDOP 2, ⅓ for HDOP 3, etc.

In a variant of the embodiment, if a HDOP value varies between two adjacent probe points then the probe segment connecting those two points is assigned the higher (least confident) HDOP value.

In alternative embodiments, values accrued into the pixels or buckets can be conditioned (for instance by applying a weighting factor) based upon any suitable attributes of the traces, as well as or instead of based upon HDOP value.

Figure 6:
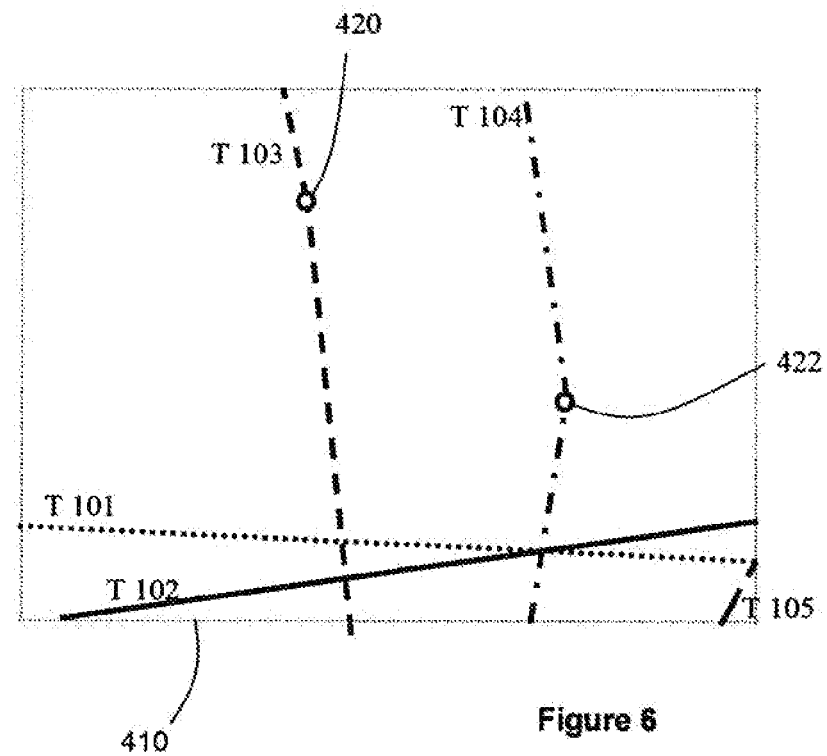
FIG. 6 is a magnified plot of the central pixel of FIG. 4 including probe data.

The accrual of values into different pixels, and different buckets of the pixels, is described by way of example with reference to the central pixel 410 of FIG. 4, which is shown again in FIG. 6 in close-up, with those parts of the traces that pass through the pixel 410 being shown overlaid on the pixel. It can be seen that only traces T101, T102, T103, T104 and T105 pass through the pixel 410. The probe trace capture points (representative of actual GPS position measurements) from which the probe trace segments are determined are shown as circles and it can be seen that only two probe capture points 420, 422 lie within the pixel 410. The probe capture points 420, 422 are also points at which the azimuth of the associated traces change, as in this embodiment the traces are assumed to follow the straight lines that join successive probe trace capture points.

The traces T101 and T103 had the highest HDOP confidence value of 1, to which a unit weighting value of 1 is assigned in this example. All other traces had a lower HDOP confidence of 2, to which a weighting value of 0.5 is assigned in this example. The values of 0.5 and 1.0 are chosen by way of example only. In practice, characteristics of the GPS unit or other probe or of its operation, and/or environmental factors, may be recorded as attribute data as part of the probe data, and any algorithm or process may be used to arrive at the weighting values based upon the attribute data.

The values accrued to different buckets of pixel 410 from the probe traces shown in FIG. 6 are provided in Table 1.

TABLE 1

| Trace ID | Quality | Azimuth (from North) | Distance within pixel (m) | Bucket ID | Value accrued to bucket (quality times distance within pixel) |
|---|---|---|---|---|---|
| T101 | 1.0 | 95° | 3.6 | 9 | 3.6 |
| T102 | 0.5 | 78° | 3.4 | 7 | 1.7 |
| T103 (prior) | 1.0 | 347° | 2.9 | 34 | 2.9 |
| T103 (post) | 1.0 | 338° | 0.7 | 33 | 0.7 |
| T104 (prior) | 0.5 | 12° | 1.4 | 1 | 0.7 |
| T104 (post) | 0.5 | 349° | 2.2 | 34 | 1.1 |
| T105 | 0.5 | 35° | 0.4 | 3 | 0.2 |

It can be seen that traces T103 and T104 have two entries in the table. Each has an entry for the portion of the trace prior to an associated probe trace capture point 420 or 422, and another entry for the portion after the associated probe trace capture point 420 or 422.

It can be seen, by way of example, that the value accrued to bucket 9 (representative of directions of travel between 90° and 100°) of pixel 410 from probe trace T101 is 3.6. That value is obtained by mutliplying the distance travelled through the pixel 410 by probe trace T101 in a direction between 90° and 100° (in this case) 95° by the weighting factor assigned to the probe trace (referred to in the table as Quality).

The score attributed to each bucket for a particular pixel can be determined by summing the values accrued to the bucket. Thus, for example, bucket 34 (representative of directions of travel between 340° and 350°) would have a score assigned to it of 4.0 at this stage of the process, that being the sum of the rows for T103 (prior to probe trace capture point 420) and T104 (prior to probe trace capture point 422).

The score attributed to each pixel can be determined by summing the values accrued to each of the buckets. In this case, the score attributed to the pixel 410 is 10.9 at this stage of the process.

In a variant of the process described in relation to FIG. 6, an algorithm can be used to split the value obtained from each trace between two adjacent buckets based on the nearness of the trace direction to the boundary of the two buckets, in order to minimize quantization effects. For example, T104 after the probe trace capture point 422 has a direction of travel of 349°, which falls within bucket 34 but which is just one degree away from falling within the next bucket, bucket 35. In the variant, instead of all of the value accruing to bucket 34, it is split so that 60% of the value (0.66 in this case) accrues to bucket 34 and 40% of the value (0.44 in this case) accrues into bucket 35.

A linear split technique algorithm is used to split values for accrual between adjacent buckets in the variant described in the preceding paragraph. In the case of 36 equally spaced angle buckets a first bucket is chosen, for example the one that contains the trace angle less 5° and each of the other buckets is numbered in succession with reference to that bucket. A part of the trace value is assigned to the bucket within which the angle of the trace falls, according to the formula Value* (1.0−(angle−5−bucket_base_angle)/10), where bucket_base_angle is defined as bucket number*10, angle represents the direction of the trace, and Value is the value of the trace. The remainder of the trace's value is placed into the bucket clockwise from the first bucket (for all buckets except for 35, this would be bucket+1; for bucket 35, it is bucket 0). Thus, in the case of trace T104 (post), the trace angle is 349°, the bucket number is 34, bucket_base_angle is 340°, and thus 60% of the value is accrued to bucket 34, with the remaining 40% being accrued to bucket 35.

In other embodiments, any suitable algorithm can be used to split values for accrual between different buckets.

Once all of the available data has been accrued into the pixels and their buckets, Gaussian smoothing is performed in both the pixel x,y domain, and also in the directional buckets, to approximate the actual relative likelihood that a good trace is traveling in a given direction at a given pixel.

A person with ordinary skill in the art will be familiar with methods to approximate a Gaussian distribution in bitmaps. Also known as Gaussian "blur", one method to achieve the desired result is to build a convolution matrix that blends the values in a neighbourhood of pixels into the center pixel of that neighborhood. Instead of numeric pixels, we have pixels with numeric buckets, so the convolution must be effected for each bucket. Similarly, Gaussian blur is performed between neighbouring directional buckets. The parameters of the Gaussian blur process are chosen simply to achieve the desired standard deviation in the final pixels, to match the behaviour of the incoming traces. For example, with a 3.5 meter pixel as described above, and traces with an expected 5 meter standard deviation, applying a convolution which generates a Gaussian blur with sigma of 1.4 pixels using the 5×5 convolution matrix provided in Table 2 provides a reasonable approximation:

TABLE 2

| | | | | |
|---|---|---|---|---|
| 0.002969 | 0.013306 | 0.021938 | 0.013306 | 0.002969 |
| 0.013306 | 0.059634 | 0.09832 | 0.059634 | 0.013306 |
| 0.021938 | 0.09832 | 0.162103 | 0.09832 | 0.021938 |
| 0.013306 | 0.059634 | 0.09832 | 0.059634 | 0.013306 |
| 0.002969 | 0.013306 | 0.021938 | 0.013306 | 0.002969 |

In alternative embodiments, additional scaling, smoothing, or statistical analysis such as autocorrelation between pixels—methods well known to those of ordinary skill in the art—may also be used in order to detect underlying trends, or to produce pixel values that may be more readily operated in future operations.

For example, in one alternative embodiment, the pixel values generated as shown above may be thresholded—or compared against a minimum acceptable value—in order to determine whether the density of traces assigned a given bucket is a statistically significant number. The threshold value itself may be taken as the number of traces expected to be assigned to a random bucket. Any bucket containing less than a particular multiple of this value may be considered filled with random noise, and may be reassigned to zero. Doing so helps to eliminate the effects of poor quality traces on the bitmap.

To apply the alternative embodiment of the preceding paragraph to the probe data of FIG. 3 and Table 1, we have seven traces (T101 to T107) comprising (within the area shown in FIG. 3) 180 meters of traveled paths. Of the 180 meters, some 90 meters has been represented in the pixel map with a confidence multiplier of 1, and the remainder with a confidence multiplier of 0.5—thus, we have accrued 135 total "units" of confidence*length into the bitmap. Given that the bitmap consists of 40 cells, 36 buckets each, division of the units accrued by the total number of buckets gives an expected random or average density of 0.094. Thus it may be decided, given the characteristics of the probe data, that any bucket containing less than two times the random noise level, is almost certainly noise. In such a case we would clear any bucket containing a value of less than 0.188.

Turning to the next stage 308, each trace is evaluated against the pixel map, based in this case on the understanding that the extent of directional corroboration indicates the value of the trace.

In the case of the data of FIG. 3, each trace T101 to T107 is scored by taking each segment between adjacent probe trace capture points for the trace, and matching that to the pixels through which it passes, and to a particular bucket or buckets within those pixels.

Thus, in the case of trace T101 it would be determined that the trace passes through pixel 410 at a direction of 95°, and that trace T101 matches with bucket 9 of that pixel. The value accrued to bucket 9 of pixel 410 is 3.6 (from Table 1) and thus a score of 3.6 is accrued to trace T101. The same process is performed for each pixel through which T101 passes, and each bucket to which it matches within those pixels. The scores from each of the matching pixel buckets are summed to provide an overall score for trace T101. Given that the value accrued to each bucket and pixel is representative of the number and length of traces passing through that pixel and matching that bucket, it can be understood that the score determined for a particular trace is representative of the extent to which it correlates with other traces.

In a variant of the process described in the preceding paragraph, when scoring a particular trace, the value attributed to a pixel bucket to which a portion of the trace matches is multiplied by the distance that the trace path traverses within that pixel. Thus, in such a variant, the score accrued to trace T101 from pixel 410 would be 3.6×3.6=12.96. In such a case, the average corroboration of the trace in the entire area of interest is simply the total calculated score in that area's bitmap, divided by the total length of the trace within the area.

The system of the embodiment of FIG. 1 is able to determine a correlation score for each probe trace or part of a probe trace based upon values determined from previous statistical analysis of probe data, thus reducing the computational burden and increasing speed. In contrast, and in addition to the issues of data generalization and spatial contamination referred to above, many known clustering techniques would require the selection of any probe data that might possibly correlate with a particular probe trace and then require subsequent processing of the probe data to determine the level of correlation of the probe trace, leading to increased computational burden.

Returning to the use of the system to process the probe traces of FIG. 3, the scores of the various traces T101 to T107 are used to select one or more of the traces for use in further processing. In one mode of operation, the highest-scoring traces are chosen as seed traces to begin further processing—which may involve one or more of: building groups of collocated traces as bundles; building a geographic network; determining the actual positions of roads; and determining a set of most likely manoeuvres (paths) for vehicles within the pixel area.

For the traces of FIG. 3, traces T101 and T102 have the most correspondence, and whichever of those two traces has the higher score will be chosen as a first seed trace. A seed trace is a trace that can be used in further operations, for example further operations to verify, amend or augment digital map data. The use of traces in such further operations can be performed in accordance with known techniques.

Traces T105, T103, and T104 have the next highest values. All of those traces are valuable for seeding further operations. Trace T107 has a lower correspondence score, and will not be used in its entirety for seeding (however, it may have a large enough correspondence to permit matching to T101 and T102). Trace T106 has little to no correspondence with the other probe traces (the pixels that trace T106 crosses may contain small values following the Gaussian smoothing operations, but they will produce a notably lower score for trace T106 than the scores for the other traces). In fact, many or all of the T106 pixels may have been eliminated by thresholding, and in that case T106 would be recognized as an errant trace and discarded.

In the embodiment described in the preceding paragraph, each trace is selected or discarded as a whole based on the score obtained for the entire trace or part of the trace under consideration. In alternative embodiments, specific pieces of a trace may be discarded, while the remainder of the trace is used, based upon the scores determined for each segment of the trace.

Figure 7:
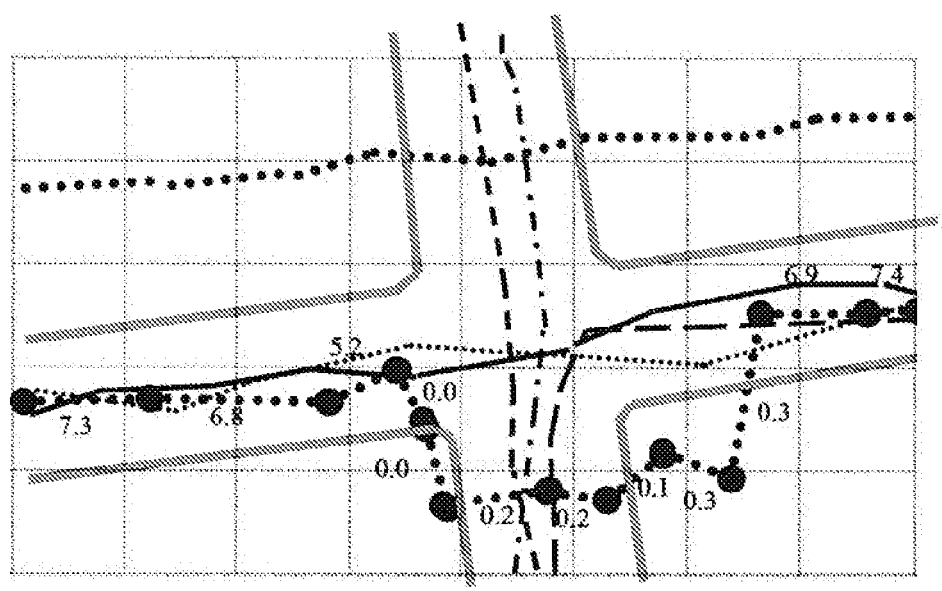
FIG. 7 is a plot of the probe data and the pixel boundaries of FIG. 3, with one of the probe traces shown in more detail.

For example, in the case of T107, the sudden jump southward near the intersection of roads 400, 402 seems to have little or no correlation with the behaviour of the other traces, and in the alternative embodiments in question, those non-correlated segments of T107 may be discarded whilst other segments of T107 may be retained, as described in more detail in relation to FIG. 7.

FIG. 7 shows the same probe data as FIG. 3, including each of traces T101 to T107. The position of the probe capture points for trace T107 have been highlighted by displaying them as solid circles. FIG. 7 also contains, between each sequential pair of probe trace capture points for trace T107, the average value from the closest Gaussian-smoothed pixel and bucket representing the travel direction and location for the segment of T107 connecting those capture points.

It can be seen that for the trace segment joining the first pair of sequential probe trace capture points for probe trace T107, the average correlation value is 7.3, which is far above the expected random noise level and represents a relatively good measurement. The values for successive segments of probe trace T107 are quite good until the segment connecting the fourth and fifth capture points. At this point the average correlation value drops precipitously—there are no other southbound traces in the window. Successive points, as the measurements head east again, only mildly correlate to the Gaussian blur in the pixel model, thus indicating a still-suspicious travel path. At probe trace capture point 11, the trace again returns to correct position.

A thermostat-type algorithm can be used to eliminate the bad portion of the trace T107. The algorithm uses two thresholds: a low threshold such as two times the expected random noise, to indicate an erroneous segment that should always be removed, and a higher threshold, for example 20 times the random noise level, below which a segment is considered suspicious and should be removed if it connects via other suspicious segments to an erroneous segment. So the thresholds will be 0.18 and 1.8, respectively in this case. The algorithm is applied to the probe trace segments in succession, the first three segments being well within acceptable values. The fourth and fifth segments are definitely erroneous, with values of 0. Of the sixth through tenth segments, with average correlation values of 0.2, 0.2, 0.1, 0.3, and 0.3; four of them are suspicious, and one (the eighth segment) is considered erroneous; but for all of these, since they attach via other suspicious segments to at least one erroneous segment, they are also removed. As a result, the thermostat-type algorithm accepts the first three segments and the last two segments of T107.

In further embodiments, the thermostat-type algorithm is modified with a hysteresis algorithm, which requires that a change in state requires a certain minimum travel distance. Thus, an erroneous portion of a path that briefly matches with other good paths is rejected in whole, rather than briefly and incorrectly being considered as a good portion. In other embodiments, any other suitable algorithms, as well as or instead of the hysteresis and thermostat algorithms can be used to determine a measure of trace goodness from the average values of underlying pixels or other scores or values.

The embodiments described in relation to FIGS. 3 to 7 have used pixel maps to represent probe position, and buckets or arrays associated with pixels of the pixel maps to represent direction. However, any suitable parameters can be represented by the pixels and/or arrays or buckets. Furthermore, additional parameters can be represented by further arrays or buckets associated with each pixel. For example, buckets for direction of travel may be augmented such that speed, height, or other attributes available from the raw probe data are represented by further buckets, and may be used to differentiate and correlate traces for a given pixel.

The probe trace data used to populate the pixel map of FIG. 3 was representative of probe trace segments which joined successive probe trace capture points with straight lines. However, any suitable algorithm can be used to generate probe trace segments from the probe trace capture points. For example, parametric splines can be used to connect probe trace capture points instead of straight lines, thereby to obtain the probe trace segment. In such cases the buckets themselves may be determined to represent not only direction of travel, but curvature of the probe trace segments as well. In other embodiments, the probe trace capture points themselves rather than probe trace segments may be used to populate the pixel map.

In a further embodiment user input data, for example relating to the location or other properties of points of interest, is represented by the pixels or by buckets or arrays of the pixels.

In the case of data points that represent a type of establishment (for example, shop, hotel, restaurant or museum), pixel buckets may represent different types of reported establishment, in which the values of the buckets represent the number of times an establishment of that type has been reported. The pixels themselves may again represent probe position. The correlation scores determined by the system can be used, for example, to determine the probe data that represents the most reliable reports of a new point of interest and its primary entrance point. The level of spread or corroboration may be used to infer other attributes, such as the importance and size of the establishment, or the locations of alternative entrances or parking locations which serve that establishment. A digital map can be updated with the new point of interest and one or more of its properties based upon the probe data concerning the point of interest that is determined to be most reliable.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system.

Equally, embodiments are not limited to using satellite-based systems but could readily function using ground-based beacons, inertial sensors, or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will be understood that the present invention has been described above purely by way of example, and modifications of detail can be made within the scope of the invention.

Each feature disclosed in the description, and (where appropriate) the claims and drawings may be provided independently or in any appropriate combination.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of processing probe trace data to determine a measure of correlation of a probe trace with other probe traces, wherein each probe trace represents travel by a user through a geographic region, the method comprising:
obtaining, by a processor, a map comprising a plurality of pixels, wherein each pixel represents a portion of the geographic region and is assigned at least one correlation value, the at least one correlation value for a pixel of the plurality of pixels being representative of at least a number of probe traces assigned to the pixel; and
obtaining, by a processor, a probe trace;
determining a correlation score for the probe trace by mapping the probe trace to at least one pixel of the map;
determining the correlation score for the probe trace from the at least one correlation value of the at least one pixel to which the probe trace is mapped; and
generating or amending, by a processor, a digital map using the obtained probe trace based on the determined correlation score for the probe trace.

2. The method according to claim 1, wherein the probe trace comprises a plurality of probe points, and the determining of the correlation score comprises mapping each probe point to a respective pixel, and determining a score for each probe point.

3. The method according to claim 1, wherein the probe trace comprises a plurality of probe trace segments, wherein each probe trace segment is mapped to a respective at least one pixel, and assigned.

4. The method according to claim 3, wherein each pixel comprises a plurality of data elements and a correlation value assigned to each of the data elements of the array of data elements.

5. The method according to claim 4, wherein the determining of the correlation score for the probe trace comprises mapping the probe trace to at least one data element of at least one pixel of the map; and
determining the correlation score for the probe trace from the at least one correlation value of the at least one data element to which the probe trace is mapped.

6. The method according to claim 4, wherein one of the data elements comprises data related to a position and another one of the data elements comprises at least one, direction, speed, height, vehicle type.

7. The method according to claim 1, further comprising determining a correlation value to be assigned to each pixel, wherein determining the correlation values comprises mapping a plurality of probe traces to the pixels; and
determining, for each pixel, the at least one correlation value for the pixel from the traces mapped to the pixel.

8. The method according to claim 1, wherein at least one weighting is assigned to each probe trace, and the correlation value for each pixel or data element is representative of the number of probe traces assigned to that pixel or data element, weighted by at least one of the weightings assigned to the probe traces.

9. The method according to claim 1, further comprising comparing the score determined for the probe trace to a threshold; and
selecting or discarding the probe trace in dependence on the comparison.

10. The method according to claim 9 further comprising generating or amending a digital map using selected probe trace or probe traces, or points or lines of the probe trace or probe traces.

11. The method according to claim 1, wherein the probe trace comprises a plurality of points or segments and a score is determined for each point or segment of the probe trace, wherein the determined score for each point or segment of the probe trace is compared to a threshold for selection or discard of each point or segment in dependence on the comparison.

12. The method according to claim 1, further comprising determining a score for a plurality of probe traces, determining a ranking of scores assigned to the plurality of probe traces and selecting or discarding probe traces based upon the ranking.

13. A system for processing probe trace data to determine a measure of correlation of a probe trace with other probe traces, wherein each probe trace represents travel by a user through a geographic region, the system comprising:
a processor and a memory;
a processing resource configured to:
obtain a map comprising a plurality of pixels, wherein each pixel represents a portion of the geographic region and is assigned at least one correlation value, the at least one correlation value for a pixel of the plurality of pixels being representative of at least a number of probe traces assigned to the pixel; and
obtain a probe trace;
determine a correlation score for the probe trace by mapping the probe trace to at least one pixel of the map;

determine the correlation score for the probe trace from at least one correlation value of the at least one pixel to which the probe trace is mapped; and generate or amend a digital map using the obtained probe trace based on the determined correlation score for the probe trace.

14. A non-transitory computer readable medium comprising computer-readable instructions that are executable to perform a method of processing probe trace data to determine a measure of correlation of a probe trace with other probe traces, wherein each probe trace represents travel by a user through a geographic region, the method comprising:

obtaining a map comprising a plurality of pixels, wherein each pixel represents a portion of the geographic region and is assigned at least one correlation value, the at least one correlation value for a pixel of the plurality of pixels being representative of at least a number of probe traces assigned to the pixel; and obtaining a probe trace;

determining a correlation score for the probe trace by mapping the probe trace to at least one pixel of the map;

determining the correlation score for the probe trace from the at least one correlation value of the at least one pixel to which the probe trace is mapped; and generating or amending a digital map using the obtained probe trace based on the determined correlation score for the probe trace.

* * * * *